(12) United States Patent
Higgins

(10) Patent No.: US 6,789,985 B1
(45) Date of Patent: Sep. 14, 2004

(54) THREE-DIMENSIONAL MIRROR-IMAGE DUPLICATING CARVER

(76) Inventor: Keven C. Higgins, 2619 Floyd St., Sarasota, FL (US) 34239

(*) Notice: Subject to any disclaimer, the term of this patent is extended or adjusted under 35 U.S.C. 154(b) by 37 days.

(21) Appl. No.: 10/356,451

(22) Filed: Jan. 31, 2003

(51) Int. Cl.[7] .................................................. B23C 1/18
(52) U.S. Cl. ........................... 409/121; 409/88; 409/94; 409/93; 144/144.1
(58) Field of Search .......................... 409/88, 109, 121, 409/124, 85, 89, 93–94, 116; 700/161; 144/144.1

(56) References Cited

U.S. PATENT DOCUMENTS

| | | |
|---|---|---|
| 2,661,661 A | 12/1953 | Zoll |
| 2,962,940 A * | 12/1960 | Laurent ...................... 409/109 |
| 3,799,028 A * | 3/1974 | Coverdale, Jr. ............. 409/113 |
| 3,838,623 A * | 10/1974 | Schell ......................... 409/104 |
| 3,841,370 A * | 10/1974 | Schell .......................... 409/94 |
| 3,922,950 A * | 12/1975 | Walter ......................... 409/103 |
| 4,000,766 A * | 1/1977 | Sutcliffe ..................... 409/111 |
| 4,078,474 A | 3/1978 | Laskowski |
| 4,181,063 A * | 1/1980 | Burry .......................... 409/88 |
| 4,278,117 A | 7/1981 | Mitchell et al. |
| 4,288,185 A | 9/1981 | Lenz |
| 4,364,695 A | 12/1982 | Lenz |
| 4,693,645 A | 9/1987 | Kjeldsen |
| 5,003,153 A * | 3/1991 | Kondo ................... 219/121.68 |
| 5,165,175 A | 11/1992 | Anderson |
| 5,993,123 A | 11/1999 | Allred, III |
| 6,067,695 A * | 5/2000 | Momoitio ..................... 409/99 |
| 6,340,039 B1 | 1/2002 | Chang |

FOREIGN PATENT DOCUMENTS

DE            3704445 A1 *    8/1988

* cited by examiner

Primary Examiner—Erica Cadugan
(74) Attorney, Agent, or Firm—Charles J. Prescott

(57) ABSTRACT

A three-dimensional mirror-image duplicating carver for producing a three-dimensional mirror-image of a three-dimensional object. First and second platforms are rotatably connected to a frame about spaced apart parallel first and second axes, respectively, and also parallel to the base. The platforms rotate equal and in opposite directions only to effect repositioning. A three-dimensional object to be duplicated in mirror image is attached to and positioned centrally on the first platform while a carvable workpiece is attached to and positioned centrally on the second platform. A support member includes a stylus and a carving tool having a carving tip spaced from the stylus a distance equal to the distance between the first and second axes and lying in a plane perpendicular to said base. By repeatedly tracing the stylus lengthwise along the object after the object and the workpiece are rotated, then held stationary at incremental angles of rotation through 360°, the carving tip removes successive narrow longitudinal slices of material from the workpiece producing the three-dimensional mirror image of the object.

4 Claims, 4 Drawing Sheets

THREE-DIMENSIONAL MIRROR-IMAGE DUPLICATING CARVER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to the field of carving or forming three-dimensional objects, and more particularly to a three-dimensional mirror image object duplicating carver which will easily and economically replicate a mirror or reverse image duplicate of a three-dimensional object.

2. Description of Related Art

The replicating of a three-dimensional duplicate in mirror image form of a three-dimensional object is typically done by making a separate mold or form of the object in three-dimensional mirror image form and then forming the mirror image replicate therefrom. Sophisticated computer or numerical controlled machining equipment is also used for this purpose. However, there appears to be no economical equipment available for the mirror image replication of such three-dimensional objects.

Applicant is aware of the following patented prior art which is in general ways related to the field of the carving of three-dimensional objects:

U.S. Pat. No. 4,078,474 to Laskowski

U.S. Pat. No. 5,993,123 to Allred, III, et al.

U.S. Pat. No. 4,693,645 to Kjeldsen

U.S. Pat. No. 2,661,661 to Zoll

U.S. Pat. No. 4,278,117 to Mitchell, et al.

U.S. Pat. No. 4,288,185 to Lenz

U.S. Pat. No. 4,364,695 to Lenz

U.S. Pat. No. 5,165,175 to Anderson

U.S. Pat. No. 6,340,039 to Chang

Of particular note as disclosed in this above prior art, Laskowski, in U.S. Pat. No. 4,078,474 teaches a three-dimensional duplicator assembly. However, this duplicator assembly is directed to simply duplicating the three-dimensional object in its exact form.

Allred, in U.S. Pat. No. 5,993,123 also teaches a three-dimensional replicating carving machine for easily duplicating wooden propellers, musical instruments, sculpture and other items utilizing a unique rollable linkage and a U-shaped frame to which the motorized cutter is mounted.

The present invention provides an economical, simple carving machine which will accurately reproduce a three-dimensional object in mirror or reverse image form.

BRIEF SUMMARY OF THE INVENTION

This invention is directed to a three-dimensional mirror-image duplicating carver for producing a three-dimensional mirror-image of a three-dimensional object. First and second platforms are rotatably connected to a frame about spaced apart parallel first and second axes, respectively, and also parallel to the base. The platforms rotate equal and in opposite directions only to effect repositioning. A three-dimensional object to be duplicated in mirror image is attached to and positioned centrally on the first platform while a carvable workpiece is attached to and positioned centrally on the second platform. A support member includes a stylus and a carving tool having a carving tip spaced from the stylus a distance equal to the distance between the first and second axes and lying in a plane perpendicular to said base. By repeatedly tracing the stylus lengthwise along the object after the object and the workpiece are rotated, then held stationary at incremental angles of rotation through 360°, the carving tip removes successive narrow longitudinal slices of material from the workpiece producing the three-dimensional mirror image of the object.

It is therefore an object of this invention to provide an economical, easily manufactured carving machine which will replicate a three-dimensional object in reverse or mirror image form.

Still another object of this invention is to provide a retrofit revision of the rotatable platforms of a conventional carving machine so that the platforms rotate in exact reverse increments one to another which, in combination with a longitudinally moveable stylus and carving machine, to replicate in reverse or mirror image form a three-dimensional object attached thereto.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
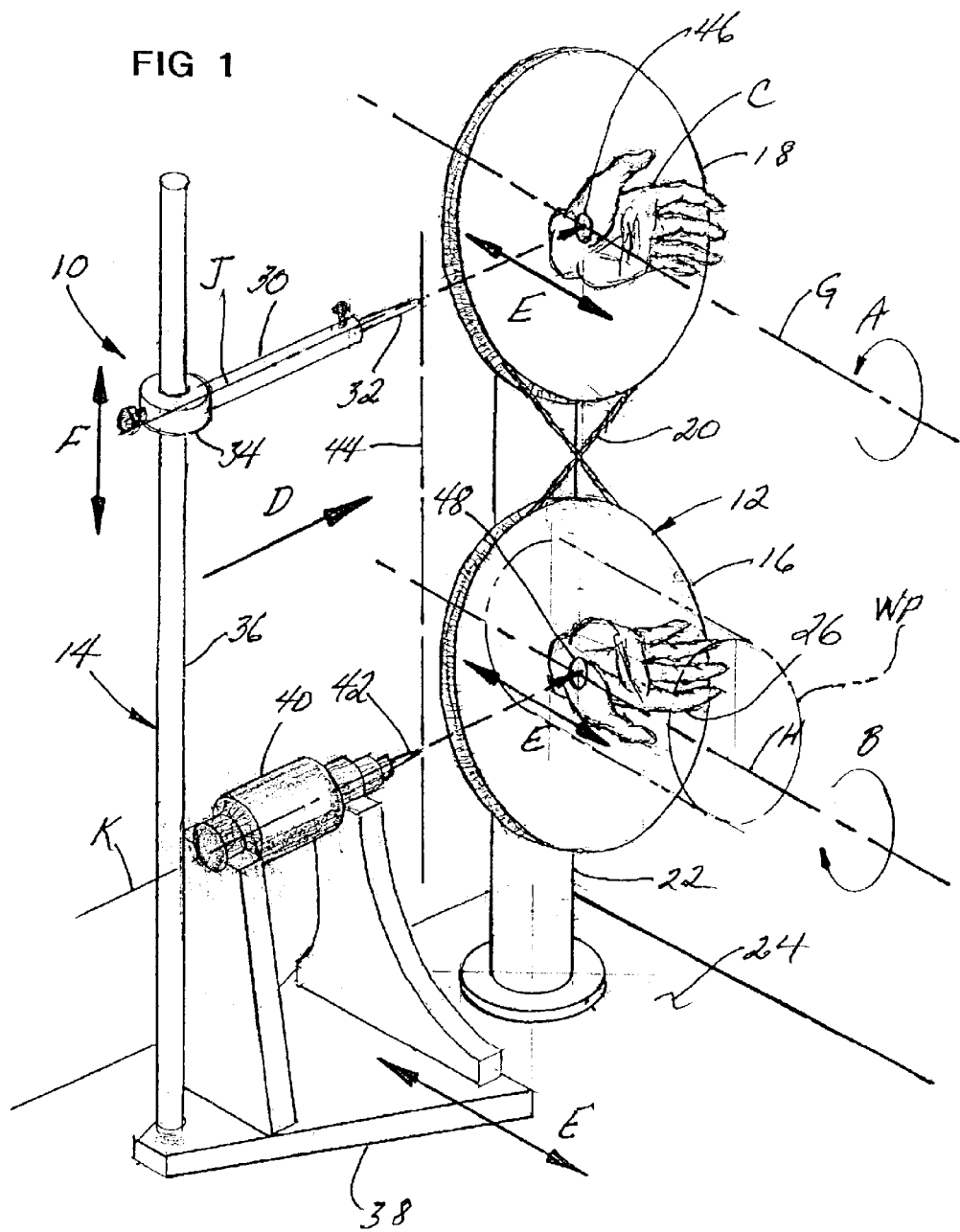
FIG. 1 is a perspective view of the invention with a three-dimensional object attached to one of the platforms and the completed mirror image replica having been carved from a workpiece shown in phantom attached to the other platform.
Figure 2:
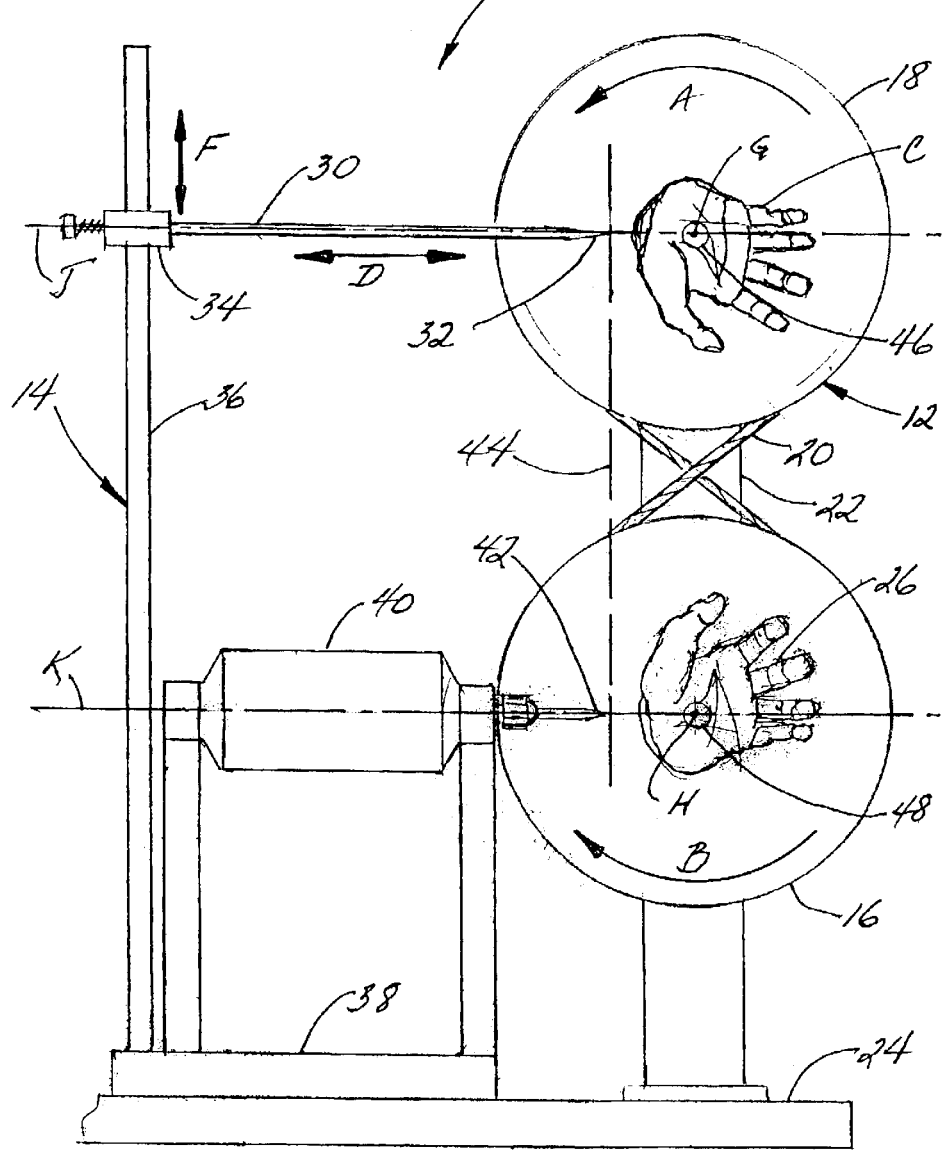
FIG. 2 is a front elevation view of FIG. 1.
Figure 3:
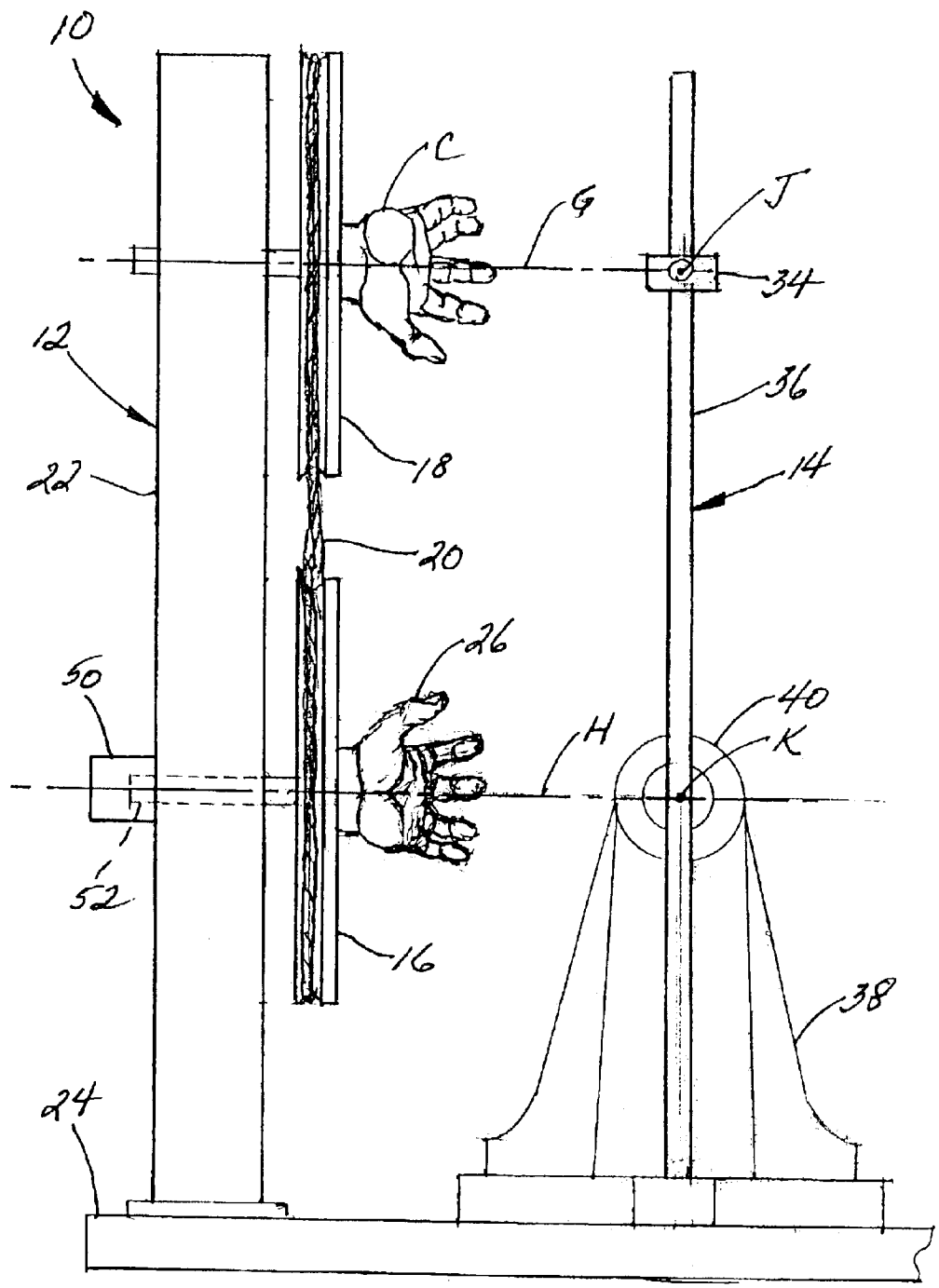
FIG. 3 is a side elevation view of FIG. 1.
Figure 4:
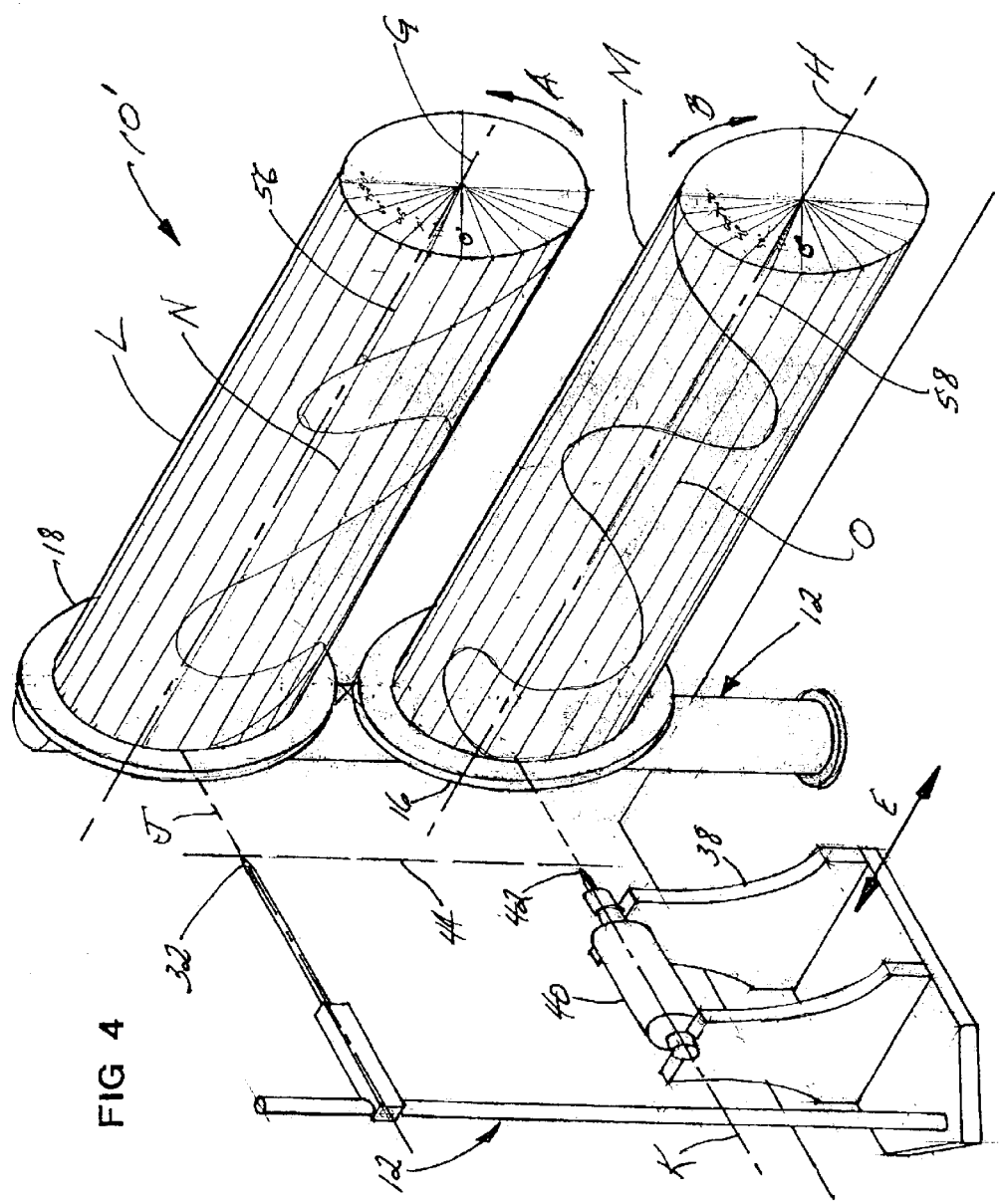
FIG. 4 is a perspective view similar to that of FIG. 1 showing in simplistic form the theory of operation of the present invention.

Referring now to the drawings, the invention is generally shown at numeral 10 in FIGS. 1 to 3 and at numeral 10' in FIG. 4. The difference between the invention at 10 and at 10' is simply with respect to the three-dimensional object L in FIG. 4 being replicated in mirror image form and the workpiece M to be carved into a mirror image replica of the three-dimensional object L.

Both of these embodiments 10 and 10' of the invention include an object and workpiece platform assembly 12 and a support member assembly 14. The platform assembly 12 includes an elongated upright frame 22 which is rigidly connected to a flat base 24. First and second platforms 18 and 16, respectively, are mounted for rotation only to the frame 22 in spaced apart relationship about axis of rotation G and H, respectively. These axes G and H are parallel to one another and to the flat working surface of base 24.

The platforms 16 and 18 are made to rotate in opposite directions, platform 18 rotating in counterclockwise fashion as seen in FIG. 1 in the direction of arrow A while platform 16 simultaneously rotates about axis H in a clockwise direction in the direction of arrow B. This is accomplished by attaching a drive belt 20 around the grooved perimeter of each platform 16 and 18 so that it crisscrosses as best seen in FIGS. 1 and 2. Additionally, the effective diameters of each of these platforms 16 and 18 is identical so that an incremental movement of platform 18 in the direction of arrow A will cause platform 16 to move in an exact incremental angular amount of movement oppositely in the direction of arrow B. A drive motor 50 shown in FIG. 3 attached to the rotational shaft 52 which drivingly engages platform 16 to effect the small incremental movement, e.g. IFN 5° increments and then secure, stationary retention of each new incremental position thereafter. Manual movement and stopping means may also be used to effect small incremental movement and then immobilization of these platforms 16 and 18.

The support assembly 14 includes an upright support member 36 having a base 38 which is slidably moveable atop base 24. A stylus 32 and tubular stylus support 30 attached to adjustable collar 34 is slidably engagable on support member 36 in the direction of arrow F and made securable in any desired position by a thumb screw of collar 34. A motorized carver 40 having a carving tip 42 is connected to the slidable base 38 of the support assembly 14.

The tips of the stylus 32 and carving tip 42 are aligned along imaginary line 44 which is perpendicular to the base 24. The spacing between the stylus 32 and the carving tip 44 on support 36 is exactly equal to the spacing between the axes of platform rotation G and H. Further, in one aspect of describing this relationship, a longitudinal axis J of the stylus 32 and a longitudinal axis K of the carving machine 40 are also preferably parallel one to another and to the base 24.

Method of Operation

To operate the present invention 10 or 10' to create a mirror or reverse image of a three-dimensional object shown by example at C in FIGS. 1 to 3 and at L in FIG. 4, a workpiece shown, for example at WP in phantom in FIG. 1 as a cylindrical piece of solid material such as wood, is attached to the platform 16 such that the axis H passes centrally through the workpiece WP. The three-dimensional object C is likewise attached to platform 18 so that the rotational axis G passes centrally through the three-dimensional object C.

The initial setup of the present invention includes the rigid attachment of the three-dimensional object C to be replicated in mirror image form to rotatable platform 18 such that the axis of rotation G passes centrally through the three-dimensional object. Next a carvable workpiece shown in phantom at WP is attached to platform 16 with the rotational axis H passing centrally therethrough. Note that the workpiece WP needs to be at least as large as the outer perimeters, both radially and lengthwise, of the three-dimensional object C or L to be replicated in mirror image form.

Next, the stylus 32 is adjusted in the direction of arrow F along support member 36 to preferably be at the same height, but at a minimum having its axis J aimed and oriented directly at and perpendicular to axis G. Next, the motorized carving machine 40 and carving Up 42 are adjusted so that the carving tip 42 and its rotational axis K are also aligned with and perpendicular to rotational axis H. The stylus 32 and the carving tip 42 must also lie in a vertical or orthogonal plane along line 44 with respect to base 24.

Rotational movement of the platforms 16 and 18 is then adjusted at a reference point such as 0° at N and O as shown in FIG. 4 and secured in that position and arrested from further movement by control unit 50. Thereafter, the carving motor 40 is activated and the entire assembly 14 is moved in the direction of arrow D toward the object C and the workpiece WP. Once stylus 32 contacts an area of the object C such as at 46, the carving tip 42 would have already carved into the workpiece WP at area 48. By movement of the stylus 32 along a meridian line such as that shown at 56 of object L in FIG. 4, the stylus 32 traces that longitudinal meridian of the object C or along 56 of object L while the carving tip 42 replicates that meridian contour precisely by machining away a slit or slice of the workpiece WP or M.

Thereafter, in successive passes in the direction of arrow E after rotation of each of the platforms 16 and 18 small increments such as 5° as shown in FIG. 4, both platforms 16 and 18 are again secured from further movement while another longitudinal pass of the stylus 32 against the three-dimensional object C or L allows the carving Up 42 to cut yet another slice of material away from the workpiece WP or M.

Because the workpiece WP or M is repeatedly rotatably repositioned in the opposite direction at each incremental movement of the platform 18 of object C or L, the exact mirror image of the outer contour or surface of the object C or L is carved from the workpiece WP or M. The incremental movements, e.g. 5° between each longitudinal cut is sufficiently small so that the carving tip 42 creates a substantially uniform surface matching and mirror image that of the object C or L.

When longitudinal cuts or slices are made through at least 360° of incremental rotational movement of both the object C or L and the workpiece WP or M, the three-dimensional mirror image object 26 in FIGS. 1 to 3 is thus created.

It should be understood that the invention may also include a pivoting arm with its motion limited to a single plane for the stylus and carving tip and interacting through the respective vertical axes. Removal of material through a vertical meridian of the counter rotating work platform would thus be accomplished in a manner in keeping with the present invention.

This invention may also be used to produce partial mirror images in relief by locating the original three-dimensional object and the work piece both facing outwardly at the initial positioning and orientation of each of the rotating platforms a distance from the center of rotation of each platform equal to one another. The three-dimensional object is thus treated as a segment of a three-dimensional piece wherein each platform is only rotated through an angle of rotation of less than 360° to accomplish this mirror duplication.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A three-dimensional mirror-image duplicating carver comprising:

a frame connected to and extending from a flat base;

first and second platforms rotatably connected to said frame about spaced apart parallel first and second axes, respectively, each said axis also being parallel to said base, said second platform rotating an angular amount substantially equal to, and in the opposite direction of rotation from, said first platform;

said first platform receiving a three-dimensional object to be replicated in mirror image form attached thereto and positioned centrally on said first platform whereby said first axis passes centrally through the object;

said second platform receiving a carvable workpiece attached thereto and positioned centrally on said second platform whereby said second axis passes centrally through the workpiece;

said first and second axes spaced from said base a first and a second distance, respectively;

a support member including a stylus connected thereto and being positionable by sliding movement of said support on and parallel to said base while said stylus is held against and traces a longitudinal contour of the three-dimensional object, said stylus being spaced from said base a distance equal to said first distance;

a carving device connected to said support and having a carving tip spaced from said stylus a distance equal to the spaced apart distance between said first and second axes and spaced from said base a distance equal to said second distance;

said stylus and said carving tip facing in the same direction and lying in a plane perpendicular to said base whereby, as said stylus is repeatedly traced lengthwise along the object parallel to said first axis after said first platform together with the object and said second platform together with said workpiece have been rotated opposite in direction one to another about said first and second axes, respectively, a small incremental angle and then held thusly during each lengthwise tracing motion of said stylus, said carving tip removes a narrow longitudinal slice of material from said workpiece exactly duplicating each traced longitudinal profile followed by said stylus, thereby producing an exact three-dimensional mirror image of the object when the small incremental angles total at least 360°.

2. A three-dimensional mirror-image duplicating carver comprising:

a frame connected to and extending from a flat base;

first and second platforms rotatably connected to said frame about spaced apart parallel first and second axes, respectively, each said axis also being parallel to said base, said second platform rotating an angular amount substantially equal to, and in the opposite direction of, rotation from said first platform;

said first platform receiving a three-dimensional object to be replicated in mirror image form attached thereto and positioned centrally on said first platform whereby said first axis passes centrally through the object;

said second platform receiving a carvable workpiece attached thereto and positioned centrally on said second platform whereby said second axis passes centrally through the workpiece;

a support member including a stylus connected thereto and being positionable by sliding movement of said support on and parallel to said base while said stylus is held against and traces a longitudinal contour of the three-dimensional object;

a carving device connected to said support and having a carving tip spaced from said stylus a distance equal to the spaced apart distance between said first and second axes;

said stylus and said carving Up facing in the same direction, lying in a plane perpendicular to said base and oriented to move in a plane defined by said first and second axes, respectively, whereby, as said stylus is repeatedly traced lengthwise along the object parallel to said first axis after the object and said workpiece have been rotated opposite in direction one to another about said first and second axes a small incremental angle and then held thusly during each lengthwise tracing motion of said stylus, said carving tip removes a narrow longitudinal slice or strip of material from said workpiece exactly duplicating each traced longitudinal profile followed by said stylus, thereby producing an exact three-dimensional mirror image of the object when the small incremental angles total at least 360°.

3. A three-dimensional mirror-image duplicating carver comprising:

a frame connected to and extending orthogonally from a flat base;

first and second platforms rotatably connected to said frame about spaced apart parallel first and second axes, respectively, each said axis also being parallel to said flat base, said first and second platforms rotating in angular movement substantially equal to, and in opposite directions of rotation one to another;

said first platform receiving a three-dimensional object to be replicated in mirror image form attached thereto and positioned centrally on said first platform whereby said first axis passes centrally through the object;

said second platform receiving a carvable workpiece attached thereto and positioned centrally on said second platform whereby said second axis passes centrally through the workpiece;

a separate support member slidably moveable on said base and including a stylus connected thereto which is positionable by sliding movement of said support on and parallel to said base while said stylus is held against and traces a longitudinal contour of the three-dimensional object;

a carving device connected to said support and having a carving tip spaced from said stylus a distance equal to the spaced apart distance between said first and second axes;

said stylus and said carving tip facing in the same direction and at said first and second axes, respectively, and lying in a plane perpendicular to said base whereby, as said stylus is repeatedly traced lengthwise along the object parallel to said first axis after said first platform carrying the object and said second platform carrying workpiece have been rotated in opposite directions one to another about said first and second axes, respectively, small incremental angles through 360° and then held thusly during each lengthwise tracing motion of said stylus, said carving tip removes a narrow longitudinal slice of material from said workpiece exactly duplicating each traced longitudinal profile followed by said stylus, thereby producing an exact three-dimensional mirror image of the object.

4. A three-dimensional mirror-image duplicating carver comprising:

a frame connected to and extending from a flat base;

first and second platforms rotatably connected to said frame about spaced apart parallel first and second axes, respectively, each said axis also being parallel to said base, said second platform rotating an angular amount substantially equal to, and in the opposite direction of, rotation from said first platform;

said first platform receiving a three-dimensional object to be replicated in mirror image form attached thereto;

said second platform receiving a carvable workpiece attached thereto and positioned centrally on said second platform;

a support member including a stylus connected thereto and being positionable by sliding movement of said support on and parallel to said base while said stylus is held against and traces a longitudinal contour of the three-dimensional object;

a carving device connected to said support and having a carving tip spaced from said stylus a distance equal to the spaced apart distance between said first and second axes;

said stylus and said carving tip facing in the same direction, lying in a plane perpendicular to said base and oriented to move in a plane defined by said first and second axes, respectively, whereby, as said stylus is repeatedly traced lengthwise along the object parallel to said first axis after the object and said workpiece have been rotated opposite in direction one to another about said first and second axes a small incremental angle and then held thusly during each lengthwise tracing motion of said stylus, said carving tip removes a narrow longitudinal slice or strip of material from said workpiece exactly duplicating each traced longitudinal profile followed by said stylus, thereby producing at least a portion of a three-dimensional mirror image of the object.

* * * * *